SUPPRESSED-CARRIER AMPLITUDE MODULATION DETECTOR

Filed May 22, 1963

INVENTOR.
Fleming Dias
BY
[signature]
Atty.

United States Patent Office 3,151,217
Patented Sept. 29, 1964

3,151,217

SUPPRESSED-CARRIER AMPLITUDE MODULATION DETECTOR

Fleming Dias, Chicago, Ill., assignor to Zenith Radio Corporation, Chicago, Ill., a corporation of Delaware Filed May 22, 1963, Ser. No. 282,325
5 Claims. (Cl. 179—15)

The present invention relates generally to a wave signal receiver for utilizing a suppressed-carrier amplitude-modulated signal. More specifically, the invention is directed to a detector circuit for such a receiver.

Receivers of the type described above have a wide range of applications. They are especially suited for producing separated audio signals from a received, frequency-modulated stereophonic broadcast transmission and, consequently, the invention will be described in that environment. The invention represents a further development of the frequency-modulation receivers described and claimed in the following co-pending applications: Serial Number 22,830 filed April 18, 1960, Serial Number 118,009 filed June 19, 1961, and Serial Number 222,545 filed September 10, 1962, all in the name of Adrian J. De Vries, and Serial Number 251,407 filed January 14, 1963, in the name of Fleming Dias and Jouke Rypkema. All of the above-identified applications are assigned to the same assignee as the present application.

All of the previously mentioned receiver arrangements are suited for the reception of frequency-modulated stereophonic broadcasts conducted in accordance with standards established by the Federal Communications Commission. Such a broadcast is characterized by a carrier which is frequency-modulated in accordance with a complex or composite modulating function having as one term the sum of two audio signals and, as another, a sub-carrier which has been suppressed-carrier amplitude-modulated by the difference of those two audio signals. The utilization of such a broadcast entails deriving a signal corresponding to the composite modulating function by demodulating the program carrier in a frequency-modulation detector and then operating on that signal to demodulate the amplitude-modulated subcarrier and develop the two audio signals separated from one another. The co-pending applications mentioned above describe and claim various solutions to this problem of demodulation.

Application Serial Number 22,830 discloses a synchronous demodulator which may include a balanced-anode beam deflection tube for deriving the two audio signals of the stereophonic broadcast. That application teaches that one audio signal may be recovered in the load circuit of one of the two anode segments of a beam deflection tube, while the other audio signal may be derived from the load circuit of the remaining anode segment. In each case, however, there is also developed in the anode load circuits a certain amount of unwanted signal component which may be canceled out by matrixing, for example with a signal derived from a cathode load of the deflection-tube demodulator.

Application Serial Number 118,009 discloses a synchronous demodulator, employing a pair of diodes, in which the two audio signals are developed by operating upon the signal output of the frequency-modulation detector of the receiver and in which clean separation of the audio signals is accomplished by matrixing. The matrixing signal is obtained from the frequency-modulation detector or some subsequent stage of the receiver which has been arranged to provide an output of the appropriate polarity.

Application Serial Number 222,545 discloses in one embodiment a demodulator which employs a pair of transistors for demodulating the amplitude-modulator subcarrier containing the difference information of the audio signals. A phase-reversed and amplified form of the demodulation components appears in the collector circuits of the transistors; this includes a fraction of the sum portion of the composite signal so that direct matrixing of the sum signal with the output signal of the frequency-modulation detector may be accomplished to provide a composite signal containing all the transmitted information. This arrangement eliminates the requirement for a phase inverter between the output of the frequency-modulation detector and the matrix network or any other circuitry relied on solely to provide a signal of the particular polarity required for matrixing. An alternative embodiment employs a single symmetrical triode transistor arranged to develop, after proper matrixing, one of the audio signals in one load circuit and the other audio signal in the remaining load circuit.

Application Serial Number 251,407 discloses a detector circuit employing a single unsymmetrical transistor which when properly biased produces equal-level separated audio output signals. With this arrangement a single, inexpensive conventional transistor may be employed for satisfactory demodulation. An alternative embodiment discloses the use of two conventional, unsymmetrical transistors placed back to back to provide separated audio output signals. With proper proportioning of the various circuit components, unmatched transistors may be employed to provide substantially equal-level separated audio output signals.

The present invention is an improvement over the receivers described in the previously mentioned applications in that it is directed to a suppressed-carrier amplitude-modulation detector employing a single transistor, of either the symmetrical bilateral or the conventional unsymmetrical variety, which provides separated audio output signals at appreciable higher levels than provided by previous single-transistor detector circuits.

It is a general object of this invention, therefore, to provide a receiver having a new and improved suppressed-carrier amplitude-modulation detector.

It is also an object of this invention to provide a new and improved broadcast receiver for utilizing monophonic transmissions or frequency-modulated stereophonic transmissions complying with current signal specifications of the Federal Communications Commission.

It is a specific object of the invention to provide a new and improved suppressed-carrier signal synchronous demodulator which provides higher level output signals and yet is no more expensive when compared to prior devices.

A synchronous demodulator constructed in accordance with the invention may be used in a receiver for stereophonic broadcast signals of the type comprising a main carrier frequency-modulated in accordance with a composite signal comprising a sum signal representing the sum of two desired audio output signals and a suppressed subcarrier amplitude-modulated in accordance with a difference signal representing the difference between the desired audio output signals to demodulate the composite signals to produce the audio output signals. The demodulator comprises a detector having a pair of output electrodes and a control electrode for varying the current flow through the output electrodes and means responsive to an applied switching signal for alternately energizing the output signals at a frequency corresponding to that of the subcarrier. The demodulator further comprises a pair of load impedances respectively coupled to the output electrodes. Additionally, there are means for impressing at least the amplitude-modulated suppressed subcarrier portion of the composite signal with one polarity on the control electrode to intermodulate the amplitude-modulated subcarrier component of the composite signal with the switching signal to produce first audio-difference signal components of opposite polarities in the load impedances. There are also means for impressing at least the amplitude-modulated suppressed subcarrier portion of the composite signal with opposite polarity on both of the output electrodes for simultaneously intermodulating the amplitude-modulated subcarrier component with the switching signal and producing in the load impedances respective second audio-difference signal components augmenting the first audio-difference signal components.

The features of this invention which are believed to be novel are set forth with particularity in the appended claims. The invention, together with further objects of advantages thereof may be best understood, however, by reference to the following description taken in conjunction with the accompanying drawings, in which:

Figures 1, 2, 3:
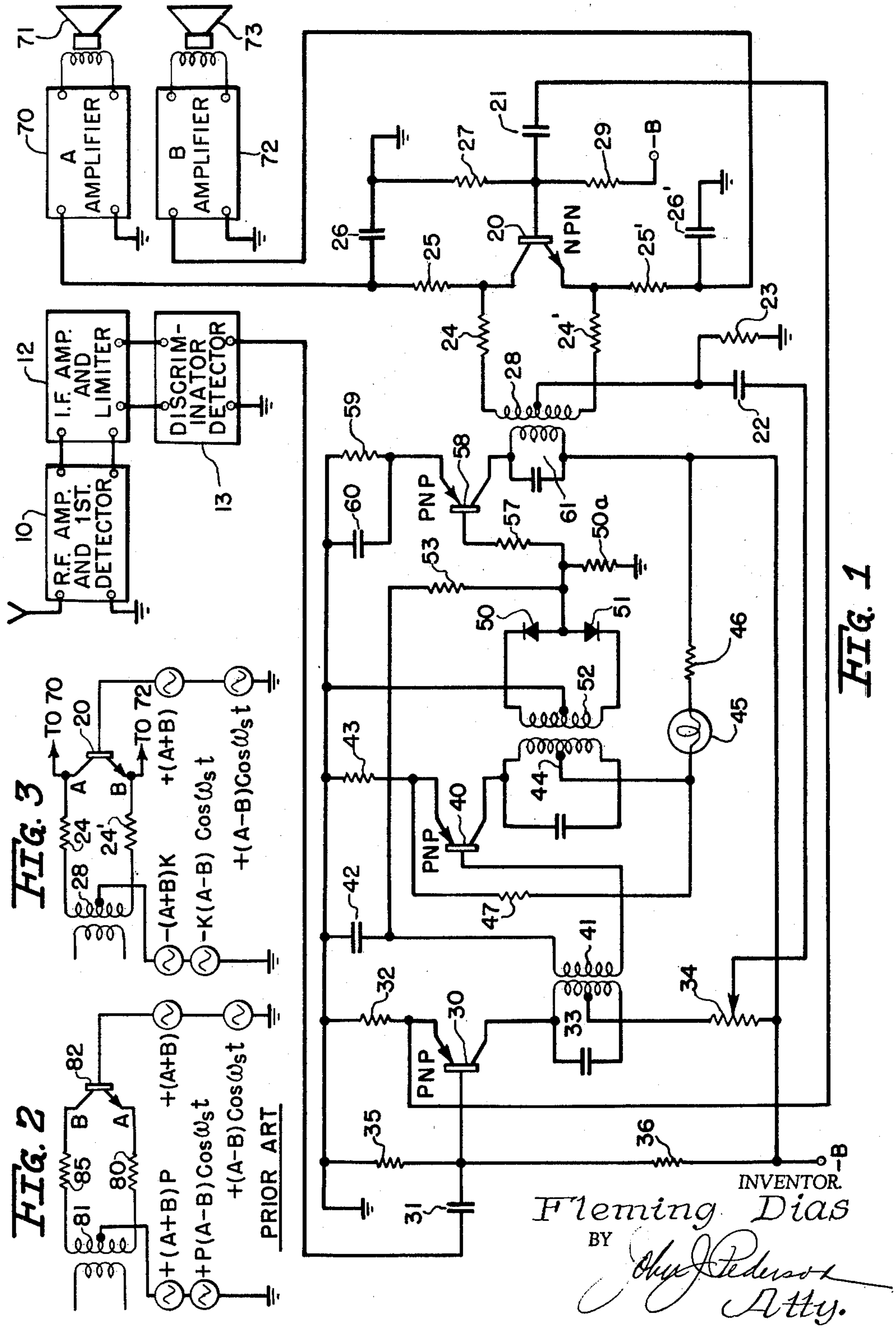
FIGURE 1 is a schematic representation of a receiver embodying the present invention.
FIGURE 2 is a simplified schematic diagram used in describing the operation of a prior art amplitude-modulation detector.
FIGURE 3 is a simplified schematic diagram used in describing the operation of the amplitude-modulation detector of the receiver of FIGURE 1.

The receiver shown in FIGURE 1 is designed to operate with a monophonic program signal or with a stereophonic program signal conforming to the specifications of the Federal Communications Commission. This signal comprises a carrier which is frequency-modulated in accordance with the sum of two audio signals. The carrier is also frequency-modulated in accordance with the subcarrier signal which has been suppressed-carrier amplitude-modulated with the difference of the same two audio signals. Since the transmission includes a suppressed-carrier component, a pilot signal is also frequency-modulated on the principal carrier to facilitate synchronization of the receiving instruments. The program signal may be represented in accordance with the following modulation function:

(1) $M_{(t)}=K_1(A+B)+K_2(A-B)\cos\omega_s t+K_3S'$ where A and B are the two audio signals and the first term of the function represents their sum. The second term represents the fundamental component of a suppressed-carrier amplitude-modulated subcarrier signal of angular frequency $\omega_s$ conveying the difference information of these two audio signals, where the expression "fundamental component" includes the first order modulation sidebands which attend the fundamental of the subcarrier and excludes higher order sidebands attendant the harmonics of the subcarrier signal. The fundamental frequency of the subcarrier is designated S, and S′ is a pilot signal of half the frequency of the subcarrier. The symbols $K_1$ through $K_3$ are constants; preferably $K_1$ and $K_2$ are equal and of an order of magnitude larger than $K_3$ so that only a small portion, perhaps 10%, of the total deviation need be devoted to the transmission of the pilot signal. Preferred forms of transmitters for developing and transmitting such a program signal are described and claimed in co-pending applications Serial Number 22,926 filed April 18, 1960, in the name of Robert Adler et al. and Serial Number 23,030 filed April 18, 1960, in the name of Carl G. Eilers, both of which applications are assigned to same assignee as the present application.

The receiver of FIGURE 1 comprises receiving circuits which, at least up to the first signal detector, are conventional. They include a radio-frequency amplifier of any desired number of stages and a heterodyning stage or first detector, both being represented by block 10. The input of the amplifying portion connects with a wave-signal antenna 11 and the output connects with a unit 12 which will be understood to include any desired number of stages of intermediate-frequency amplification and one or more amplitude limiters. Following the IF amplifier and limiter 12 is a frequency-modulation detector 13 responsive to the amplitude-limited intermediate-frequency signal for developing a composite signal, representing the modulation of the received carrier. Second detector 13 may be of any well known construction, but since a high degree of amplitude limiting is desired it is convenient that this unit be a ratio detector which exhibits limiting properties.

The composite signal developed in the load circuit of detector 13 is defined by the function of Equation 1 and, from the foregoing description of that function, includes a suppressed-carrier amplitude-modulated subcarrier which conveys the difference information of the two audio signals. In accordance with the invention, complete demodulation of this suppressed-carrier amplitude-modulated subcarrier is accomplished by a detector which includes a single unsymmetrical transistor with base, emitter and collector electrodes and having a backward current gain as well as a forward current gain, the latter however, being substantially greater than its backward current gain. The term "current gain" is here used to mean the characteristic of a three-element transistor popularly referred to as "beta." In conventional unsymmetrical transistors, the forward beta is generally very much greater in magnitude than the backward beta although the back beta is usually more than unity.

More specifically, the amplitude-modulation detector of FIGURE 1 comprises a transistor 20 of the NPN type although its gender is of no particular consequence. Structurally, transistor 20 is of the conventional unsymmetrical variety having a base or control electrode and emitter and collector output electrodes. A pair of load circuits are coupled to the emitter and collector output electrodes, respectively. These load circuits comprise a pair of load impedances or resistors 24 and 24′, which need not be of equal ohmic value, and a center-tapped coil 28 which is the secondary winding of a transformer and has its opposed terminals connected to corresponding terminals of resistors 24, 24′. If load resistors 24, 24′ are of unequal value, it is preferable that the one of larger value be employed in the emitter circuit. The emitter and collector electrodes of transistor 20 are returned to ground through de-emphasis networks comprising on one hand, a resistor 25 and a capacitor 26 for one electrode and for the other electrode a resistor 25′ and a capacitor 26′. A pair of resistors 27 and 29 are series-connected between a negative bias potential source −B and ground, and their junction connects with the base electrode of transistor 20 to back bias the transistor 20 that, in the absence of a demodulation signal presently to be described, there is no current flow in the transistor.

The suppressed-carrier amplitude-modulated subcarrier component of the composite signal developed in FM detector 13 is applied in one polarity to the base electrode of transistor 20 from a source having a source impedance less than the impedance of either of the emitter and collector load circuits. To this end, the base electrode is coupled by a conductor through a capacitor 21 to the emitter electrode of a transistor device and a resistor 32 in a tuned amplifier 30 to be discussed subsequently. The conductor and capacitor 21 serve as means for impressing at least the amplitude-modulated suppressed subcarrier portion of the composite signal with one polarity on the control or base electrode of transistor 20 to intermodulate the amplitude-mdulated subcarrier component of the composite signal with a switching or demodulating signal, to be described, to produce first audio-difference signal components of opposite polarities in load impedances 24, 24′.

The suppressed-carrier amplitude-modulation subcarrier component of the composite signal is also applied to the emitter and collector of transistor 20 in an opposite polarity by way of the center tap of coil 28. This signal is applied from a potentiometer 34 in one output circuit of amplifier 30 by way of a series capacitor 22 and a shunt resistor 23 to the tap on coil 28. Capacitor 22 and potentiometer 34 serve as means for impressing at least the amplitude-modulated suppressed subcarrier portion of the composite signal with opposite polarity on both of the output electrodes for simultaneously intermodulating the amplitude-modulated subcarrier component with the switching signal and producing in the load impedance 24, 24' respective second audio-difference signal components augmenting the first audio-difference signal components.

In order to detect the suppressed-carrier amplitude-modulated subcarrier, it is necessary to apply to transistor 20 a subcarrier-frequency switching or demodulating signal. The means for applying such a demodulating signal comprises an amplifier tuned to the pilot component of the composite signal derived from detector 13 and a frequency doubler, assuming of course that the pilot frequency is one-half the frequency of the subcarrier. The pilot amplifier is provided by another PNP transistor 30 having a base electrode coupled through a capacitor 31 to the output of detector 13. The emitter is connected to ground through the resistor 32 while the collector connects to a bias source —B through a resonant circuit 33, which is tuned to the pilot frequency, and through the potentiometer control 34. Resistor 32 is coupled to frequency-modulation detector 13 by means of transistor 30 and serves as first circuit means for developing a composite signal of one polarity, while tuned circuit 33 and potentiometer 34 serve as second circuit means also coupled to detector 13 for developing a composite signal of opposite polarity. The base of transistor 30 is connected to the junction of a pair of resistors 35, 36 which are connected across the bias supply and in this fashion, the transistor receives its operating bias.

Amplifier 30 is connected to another tuned amplifier including a similar transistor 40 having its base inductively coupled through a coil 41 to tuned circuit 33 of amplifier 30. The low-potential terminal of coil 41 is returned to ground through a capacitor 42. The emitter electrode of transistor 40 is grounded through a resistor 43 while the collector is connected to the bias source through a resonant circuit 44 tuned to the pilot frequency and through the series arrangement of an indicator lamp 45 and a resistor 46.

Tuned amplifier 40 drives a frequency doubler comprising a pair of semiconductor diodes 50, 51 connected across the opposite terminals of a coil 52 which is inductively coupled to resonant circuit 44. The junction of diodes 50, 51 is returned to ground through a diode load resistor 50*a*. The circuit of diodes 50, 51 is similar to that of a full wave rectifier, and a connection from their junction through a resistor 53 to the low-potential terminal of coil 41 constitutes a regenerative feedback connection for amplifier 40. The amplifier 40 is normally biased to cut-off because of the potential applied to its emitter through lamp 45, resistor 46 and a resistor 47 coupled between lamp 45 and resistor 43. The regeneration afforded by the direct-current feedback path through resistor 53 increases the sensitivity and gain of the amplifier in the presence of a pilot carrier which has an amplitude exceeding the threshold level of the amplifier. This regenerative feature of the receiver and the lamp 45 for indicating stereophonic operating are described and claimed in co-pending application Serial No. 118,009.

Finally, a resistor 57 connects the junction of diodes 50 and 51 to the base electrode of the transistor 58 of another tuned amplifier. The emitter of transistor 58 is returned to ground through a resistor 59 bypassed by a capacitor 60 while the collector is coupled to the bias supply through a resonant circuit 61 that is tuned to the subcarrier frequency to provide a source of demodulating or switching signal. In the absence of an output signal from frequency doubler 50, 51, the bias of the base electrode of transistor 58 is very low or zero and the transistor is nearly cut-off. Tuned circuit 61 is inductively coupled to coil 28 to apply the demodulating or switching signal from tuned circuit 61 in push-pull relation to the emitter and collector output electrodes of transistor 20. Coil 28 serves as means responsive to the applied switching signal for alternately energizing the output electrodes at a frequency corresponding to that of the subcarrier signal. If desired, one or more of tuned circuits 33, 34 and 61 may be made adjustable to facilitate optimum phasing of the demodulating signal.

In the illustrated embodiment of the invention, the signal applied to the center tap of coil 28 is a detected composite signal which includes the audio-sum signal. The sum-signal component is thus applied in like phase to load resistors 24 and 24', where it is matrixed with the opposite-polarity detected audio-difference signals to provide separated audio output signals A and B.

The separated A audio signal developed in the circuit of load resistor 24 of amplitude-modulation detector 20 is applied to the input of an A audio amplifier 70 which is coupled to a loudspeaker 71. Similarly, the B audio signal developed in the circuit of the remaining load resistor 24' of detector 20 is delivered to the input of a B audio amplifier 72 which drives a loudspeaker 73. Amplifiers 70, 72 may be considered as means coupled to the respective load impedances 24, 24' for separately utilizing the audio output signals. The speakers are arranged spacially to develop a stereophonic pattern in the area that they serve.

In considering the operation of the described receiver, it may be assumed initially that no signals are intercepted by antenna 11. In this no-signal condition, amplifiers 40 and 58, frequency doubler 50, 51 and amplitude-modulation detector 20 are all substantially non-conductive whereas amplifier 30 is conditioned to accept and amplify the pilot signal component of the stereophonic program signal should such a signal be received. For the assumed condition, however, there is no output obtained from the receiver.

Let it now be assumed that the receiver is tuned to intercept a stereophonic program signal. That signal is translated in the customary fashion to frequency-modulation detector 13 which, in response thereto, produces a composite signal corresponding to the modulation of the received carrier. The only audio-frequency component of the detected composite signal, as indicated in Equation 1, is the sum of the two program signals A and B. Their difference appears as the modulation of the suppressed-carrier amplitude-modulated 38-kilocycle subcarrier, as represented by the second term of Equation 1. The detected composite signal is delivered through capacitor 31 to amplifier 30 and is amplified in the usual way. The pilot signal component is transferred to tuned amplifier 40 for further amplification and then to frequency doubler 50, 51. The output of the frequency doubler is fed back through resistor 53 and the direct-current component of the output voltage increases the sensitivity of amplifier 40 and therefore increases the amplitude of the subcarrier-frequency demodulating signal developed through the frequency multiplication. This demodulating signal is in turn amplified in amplifier 58 and supplied in push-pull relation to the emitter and collector of amplitude demodulator 20.

At the same time, as conduction in transistor 40 increases due to the regenerative effect, its collector current builds up and indicator lamp 45 turns on, indicating stereophonic reception. Additionally, the composite signal from detector 13 is applied from amplifier 30 in opposite polarities to the base electrode of transistor 20 and to the center tap of coil 28. The suppressed-carrier amplitude-modulated components of these two applied composite signals are detected by intermodulation with the subcarrier-frequency demodulating signal concurrently applied to the emitter and collector electrodes from the frequency-doubler chain.

During half-cycles of one polarity of the demodulating signal, the emitter electrode has the polarity required for it to function as an emitter. In each such interval, there occurs between emitter and base electrodes an action that is similar to diode action and the modulation components of the two modulated subcarriers are developed in load resistor 24'. At the same time the collector electrode, on which the opposite polarity of the demodulating signal is impressed, functions as an output electrode. The detected modulation components are transferred from the emitter to the collector circuit and, in usual transistor operation, experience a polarity reversal. As a consequence, the collector develops in its load circuit a reversed-polarity replica of the signal developed in the load circuit of the emitter electrode. On opposite-polarity half-cycles of the demodulating signal, the functions of the emitter and collector electrodes are reversed and now the emitter electrode functions as the output electrode. Through this demodulation process one of the load circuits, for example resistor 24, develops the difference information of the two audio signals in one polarity while the other load resistor 24' develops the same audio difference information but in opposite polarity.

The matrix connection through capacitor 22 supplies the sum of the two audio signals to these load circuits in like phase and potentiometer 34 is adjusted to supply the sum signals in such amplitude as required to accomplish matrixing so that one load circuit develops cleanly separated A audio information while the other develops cleanly separated B audio information for respective application through de-emphasis networks 25, 26 and 25', 26' to amplifiers 70, 72 and speakers 71, 73. The matrixing operation need not be accomplished in detector 20 although that lends to simplicity; it may be carried out in a subsequent stage if desired.

Transistor detector 20 is generally similar in construction and operation to that described in co-pending application Serial Number 251,407 referred to above. However, in accordance with the present invention, transistor stage 20 provides output signals of increased magnitude over prior detector circuits because the subcarrier component of the composite signal applied to the base of detector 20 is of opposite polarity to that applied to the load circuits.

In the prior art circuit of FIGURE 2, an amplitude-modulation detector of the type described in previously mentioned co-pending application Serial Number 251,407 is shown. The $(A+B)$ and $(A-B)$ cos $\omega_s t$ terms of the composite signal (1) are applied to the base electrode of a demodulator transistor 82. A pair of load resistors 80, 85 respectively couple the collector and emitter electrodes of transistor 82 to a coil 81 which is similar to coil 28 of FIGURE 1. Applied to the center tap of coil 81 are the $(A+B)$ and the $(A-B)$ cos $\omega_s t$ terms of the composite signal reduced by an attenuation factor $p$.

Assuming that only a left or A program signal is being transmitted, that is, the right or B program signal is zero, the audio terms of the signal appearing at the A terminal are:

$$-\frac{2}{\pi}Ap+Ap+\frac{2}{\pi}A \tag{2}$$

The first term of Equation 2 is a result of demodulation of the subcarrier term applied to the load circuit through coil 81. The coefficient $$\frac{2}{\pi}$$

is the efficiency factor resulting from the detecting operation. The second term is audio component of the sum signal applied through the center tap while the third term of Equation 2 is the audio component resulting from demodulation of subcarrier signal applied to the base of transistor 82. As seen from Equation 2, the (A+B) signal applied to the base of transistor 82 does not contribute to the audio components appearing at terminal A.

The audio components of the signal appearing at the B terminal are:

$$+\frac{2}{\pi}Ap+Ap-\frac{2}{\pi}A \tag{3}$$

The three terms result from detection of the same two portions of the composite signals applied to the base and load circuits of transistor 82 with only the polarities of the first and third terms being different.

As the signal developed at the B terminal should be zero, it is possible to determine the amount of attenuation $p$ required for matrixing by setting Equation 3 equal to zero. In this manner, the required attenuation $p$ is found to equal 0.4. When the value $p$ inserted into Equation 2, the A audio signal developed at the A terminal is found to have a magnitude of approximately 0.82.

The amplitude-modulation detector circuit of FIGURE 3 is a simplified circuit diagram of the detector circuit of FIGURE 1. The components of the composite signal applied to the base of the transistor 20 are in the same phase as the components applied to the circuit of FIGURE 2. The components of the composite signal applied to the load circuits of the detector of FIGURE 2, however, are of opposite phase rather than in like phase as in the circuit of FIGURE 2.

Again assuming that the left or B program signal is zero, the audio terms appearing at the A terminal of the detector 20 are:

$$-\frac{2}{\pi}AK-AK-\frac{2}{\pi}A \tag{4}$$

The first and second terms of the signal produced at terminal A are the audio components resulting from the portions of the composite signal applied to the load resistors of demodulator 20. The final term is the audio component resulting from the demodulation of the suppressed-carrier signal applied to the base of transistor 20. K is the amplification factor necessary for proper matrixing.

The audio components appearing at the B terminal are:

$$+\frac{2}{\pi}AK-AK+\frac{2}{\pi}A \tag{5}$$

As no signal should be present at the B terminal, the value of K required for proper matrixing can be determined by setting Equation 5 equal to zero. Thus, the required amplification factor K equals 1.7. If this value of K is substituted into Equation A it is found that the magnitude of the A audio signal appearing at the A terminal is 3.43.

It is readily apparent that the detector of the invention produces a significantly increased output signal when compared to the prior art circuit of FIGURE 2. The same result would be achieved if only a B or left program signal were transmitted. Furthermore, transmitting any combination of A or B program signals would result in the same increase in output over prior detectors. To achieve this increase in detection efficiency, it is necessary that the demodulator receive at least the subcarrier portions of the composite signals at its base and load circuits in opposite polarity.

As shown in Equation 2 of the prior art circuit, the first and third terms which result from demodulation of the subcarrier components applied to the detector, are of opposite polarity and cancel, resulting in an output signal corresponding only to the second term. In a circuit embodying the present invention, as shown in Equation 5, the first and third terms resulting from demodulation of the subcarrier signals are of the same polarity and add with the second term, resulting in an output signal of substantially increased magnitude as compared with that developed by the prior are circuit of FIGURE 2. Thus, the invention resides in providing means for simultaneously demodulating two oppositely phased composite signals in a common detector to provide audio-frequency output signal components which are all of mutually augmenting phase.

As an additional feature of the invention, the improved detector circuit provides increased separation because the pre-detector subcarrier attenuating networks, with their inherent phase shifting effects, employed in previous circuits are eliminated.

It is approporiate to comment on other properties of the described amplitude-modulation detector which makes its use in a freqnency-modulation stereophonic system attractive. Any audio-frequency signals applied to the transistor base electrode are converted into a higher-frequency modulated signal upon its translation through the transistor and do not appear as audio at the output electrode; hence audio interference attributable to storecasting or any other auxiliary source is effectively eliminated. The same is true for audible noise which may be present in the output of frequency-modulation detector 13. Further, it has been found that undesired or extraneous modulation on the subcarrier-frequency demodulation signal supplied by the frequency doubler does not contribute significantly to the output from detector 20. Here the detector is a double-sideband suppressed-carrier amplitude modulation detector having certain properties of a balanced demodulator in that the output signal does not contain any of the input signal frequencies.

Of course, the receiver is a two-mode arrangement because it handles monophonic as well as stereophonic transmissions. Where the received signal is a monophonic broadcast, the output of detector 13 is supplied directly from amplifier 30, through the tap of potentiometer 34, resistors 24 and 24′, the de-emphasis networks 25, 26 and 25′, 26′ to amplifier 70, 72 which now receive identical program signals. As pointed out above, in the absence of a pilot signal which identifies a stereophonic broadcast, the frequency doubler is inactive and amplitude-demodulator 20 is cutoff.

By way of illustration but in no sense by way of limitation, the following component values have been used in the amplitude-modulation detector of FIGURE 1:

| | | |
|---|---|---|
| Resistors **24** | ohms | 5000 |
| Resistors **24′** | do | 5000 |
| Resistors **25** | do | 100,000 |
| Resistors **25′** | do | 100,000 |
| Resistors **23** | do | 15,000 |
| Resistors **27** | do | 15,000 |
| Resistors **29** | do | 120,000 |
| Resistors **34** | do | 2,000 |
| Resistors **50**a | do | 10,000 |
| Capacitors **21** | microfarads | 2 |
| Capacitors **22** | do | 2 |
| Capacitors **26** | micromicrofarads | 750 |
| Capacitors **26′** | do | 750 |
| Transistor **20** NPN type | | 2N1302 |
| Transistor **100** PNP type | | 2N1372 |
| Transistor **100′** PNP type | | 2N1372 |

Thus, a new and improved amplitude-modulation detector which is substantially more efficient than prior transistor detectors has been provided. The improved efficiency is achieved without the need of any additional circuit components and, in its preferred embodiment, permits the elimination of subcarrier-frequency attenuation networks, thus providing an improved FM stereo receiver which is economical and simple to construct.

While a particular embodiment of the present invention has been shown and described, it is apparent that changes and modifications may be made therein without departing from the invention in its broader aspects. The aim of the appended claims, therefore, is to cover all such changes and modifications involved in the true spirit and scope of the invention.

I claim:

1. A synchronous demodulator for use in a receiver for stereophonic broadcast signals of the type comprising a main carrier frequency-modulated in accordance with a composite signal comprising a sum signal representing the sum of two desired audio output signals and a suppressed subcarrier amplitude-modulated in accordance with a difference signal representing the difference between said desired audio output signals, to demodulate said composite signal to produce said audio output signals, said demodulator comprising:

a detector comprising a pair of output electrodes and a control electrode for varying the current flow through said output eletrodes;

means responsive to an applied switching signal for alternately energizing said output electrodes at a frequency corresponding to that of said subcarrier;

a pair of load impedances respectively coupled to said output electrodes;

means for impressing at least the amplitude-modulated suppressed subcarrier portion of said composite signal with one polarity on said control electrode to intermodulate said amplitude-modulated subcarrier component of said composite signal with said switching signal to produce first audio-difference signal components of opposite polarities in said load impedances;

and means impressing at least the amplitude-modulated suppressed subcarrier portion of said composite signal with opposite polarity on both of said output electrodes for simultaneously intermodulating said amplitude-modulated subcarrier component with said switching signal and producing in said load impedances respective second audio-difference signal components augmenting said first audio-difference signal components.

2. A synchronous demodulator for use in a receiver for stereophonic broadcast signals of the type comprising a main carrier frequency-modulated in accordance with a composite signal comprising a sum signal representing the sum of two desired audio output signals and a suppressed subcarrier amplitude-modulated in accordance with a difference signal representing the difference between said desired audio output signals, to demodulate said composite signal to produce said audio output signals, said demodulator comprising:

a detector comprising a pair of output electrodes and a control electrode for varying the current flow through said output electrodes;

means responsive to an applied switching signal for alternately energizing said output electrodes at a frequency corresponding to that of said subcarrier;

a pair of load impedances respectively coupled to said output electrodes;

means for impressing at least the amplitude-modulated suppressed subcarrier portion of said composite signal with one polarity on said control electrode to intermodulate said amplitude-modulated subcarrier component of said composite signal with said switching signal to produce first audio-difference signal components of opposite polarities in said respective load impedances;

means impressing at least the amplitude-modulated suppressed subcarrier portions of said composite signal with opposite polarity on both of said output electrodes for simultaneously intermodulating said amplitude-modulated subcarrier component with said switching signal and producing in said load impedances respective second audio-difference signal components augmenting said first audio-difference signal components, while impressing said sum signal in like phase on said load impedances to matrix with the audio-difference signals developed therein to produce separated audio output signals in said respective load impedances;

and means coupled to said respective load impedances for separately utilizing said audio output signals.

3. A synchronous demodulator for use in a receiver for stereophonic broadcast signals of the type comprising a main carrier frequency-modulated in accordance with a composite signal comprising a sum signal representing the sum of two desired audio output signals and a suppressed subcarrier amplitude-modulated in accordance with a difference signal representing the difference between said desired audio output signals, to demodulate said composite signal to produce said audio output signals, said demodulator comprising:

an amplitude-modulation detector including a transistor having a base electrode and a pair of output electrodes functioning in alternation as emitter and collector;

means responsive to an applied switching signal for alternately energizing said output electrodes at a frequency corresponding to that of said subcarrier;

a pair of load impedances respectively coupled to said output electrodes;

means for impressing at least the amplitude-modulated suppressed subcarrier portion of said composite signal with one polarity on said base electrode to intermodulate said amplitude modulated subcarrier component of said composite signal with said switching signal to produce first audio-differences signal components of opposite polarities in said load impedances;

means impressing at least the amplitude-modulated suppressed subcarrier portions of said composite signal with opposite polarity on both of said output electrodes for simultaneously intermodulating said amplitude-modulated subcarrier component with said switching signal and producing in said load impedances respective second audio-difference signal components augmenting said first audio-difference signal components, while impressing said sum signal in like phase on said load impedances to matrix with the audio-difference signals developed therein to produce separated audio output signals in said respective load impedances;

and means coupled to said respective load impedances for separately utilizing said audio output signals.

4. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

means including a frequency-modulation detector responsive to said carrier for deriving a composite signal representing the modulation of said carrier;

an amplifier network coupled to said deriving means for developing opposite polarities of said composite signal;

an amplitude-modulation detector including a transistor having a base electrode and a pair of output electrodes functioning in alternation as emitter and collector;

means responsive to an applied switching signal for alternately energizing said output electrodes at a frequency corresponding to that of said subcarrier;

a pair of load impedances respectively coupled to said output electrodes;

means, coupled to said amplifier network, for impressing at least the amplitude-modulated suppressed subcarrier with one polarity on said base electrode to intermodulate said amplitude-modulated subcarrier component of said composite signal with said switching signal to produce first audio-difference signal components of opposite polarities in said respective load impedances;

and means, also coupled to said amplifier network, impressing at least the amplitude-modulated suppressed subcarrier portions of said composite signal with opposite polarity on both of said output electrodes for simultaneously intermodulating said amplitude-modulated subcarrier component with said switching signal and producing in said load impedances respective second audio-difference signal components augmenting said first audio-difference signal components, while impressing said sum signal in like phase on said load impedances to matrix with the audio-difference signals developed therein to produce separated audio output signals in said respective load impedances;

and means coupled to said respective load impedances for separately utilizing said audio output signals.

5. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

means including a frequency-modulation detector responsive to said carrier for deriving a composite signal representing the modulation of said carrier;

an amplifier transistor, coupled to said deriving means, having emitter and collector electrodes;

a first load circuit coupled to said emitter electrode for developing a composite signal of one polarity;

a second load circuit coupled to said collector electrode for developing a composite signal of opposite polarity;

an amplitude-modulation detector including a transistor having a base electrode and a pair of output electrodes functioning in alternation as emitter and collector;

means responsive to an applied switching signal for alternately energizing said output electrodes at a frequency corresponding to that of said subcarrier;

a pair of load impedances respectively coupled to said output electrodes;

means, coupled to said first load circuit, for comprising at least the amplitude-modulated suppressed subcarrier portion of said composite signal with one polarity as said base electrode to intermodulate said amplitude-modulated subcarrier component of said composite signal with said switching signal to produce first audio-difference signal components of opposite polarities in said respective load impedances;

means, coupled to said second load circuit, comprising means impressing at least the amplitude-modulated suppressed subcarrier portions of said composite signal with opposite polarity on both of said output electrodes for simultaneously intermodulating said amplitude-modulated subcarrier component with said switching signal and producing in said load impedances respective second audio-difference signal components augmenting said first audio-difference signal components, while impressing said sum signal in like phase on said load impedances to matrix with the audo-difference signals developed therein to produce separated audio output signals in said respective load impedances;

and means coupled to said respective load impedances for separately utilizing said audio output signal.

No references cited.